United States Patent
Tang et al.

(10) Patent No.: US 9,395,480 B2
(45) Date of Patent: Jul. 19, 2016

(54) ANTISTATIC LIGHT GUIDE PLATE AND METHOD FOR FABRICATING THE SAME

(71) Applicants: BOE TECHNOLOGY GROUP CO., LTD., Beijing (CN); BEIJING BOE DISPLAY TECHNOLOGY CO., LTD., Beijing (CN)

(72) Inventors: Wulijibaier Tang, Beijing (CN); Xin Gai, Beijing (CN)

(73) Assignees: BOE TECHNOLOGY GROUP CO., LTD., Beijing (CN); BEIJING BOE TECHNOLOGY CO., LTD., Beijing (CN)

( * ) Notice: Subject to any disclaimer, the term of this patent is extended or adjusted under 35 U.S.C. 154(b) by 82 days.

(21) Appl. No.: 14/361,022

(22) PCT Filed: Apr. 12, 2013

(86) PCT No.: PCT/CN2013/074144
§ 371 (c)(1),
(2) Date: May 28, 2014

(87) PCT Pub. No.: WO2014/121556
PCT Pub. Date: Aug. 14, 2014

(65) Prior Publication Data
US 2015/0234115 A1    Aug. 20, 2015

(30) Foreign Application Priority Data
Feb. 7, 2013  (CN) .......................... 2013 1 0049532

(51) Int. Cl.
*F21V 8/00* (2006.01)
*C08J 5/18* (2006.01)

(52) U.S. Cl.
CPC ................ *G02B 6/0065* (2013.01); *C08J 5/18* (2013.01); *G02B 6/0093* (2013.01); *C08J 2300/12* (2013.01)

(58) Field of Classification Search
CPC ........ G02B 6/0065; G02B 6/0093; C08J 5/18
See application file for complete search history.

(56) References Cited

U.S. PATENT DOCUMENTS

| 2004/0114067 A1 | 6/2004 | Kubomura et al. |
| 2005/0064154 A1* | 3/2005 | Aylward ................ B41M 3/006 428/195.1 |

(Continued)

FOREIGN PATENT DOCUMENTS

| CN | 1489711 A | 4/2004 |
| CN | 1725106 A | 1/2006 |
| CN | 101089112 A | 12/2007 |
| CN | 102207577 A | 10/2011 |
| CN | 102819061 A | 12/2012 |

OTHER PUBLICATIONS

International Search Report mailed Nov. 21, 2013; PCT/CN2013/074144.

(Continued)

*Primary Examiner* — Elmito Breval
(74) *Attorney, Agent, or Firm* — Ladas & Parry LLP

(57) ABSTRACT

A light guide plate (LGP) and a method for fabricating the same are disclosed, the LGP is electro-conductive. The fabrication method including the following steps: preparing an electro-conductive solution; making one or more surfaces of a regular LGP adsorb the electro-conductive solution uniformly; drying the LGP which adsorbs the electro-conductive solution to form an electro-conductive film on the one or more surfaces. A method for fabricating the LGP is also disclosed in which electro-conductive organic macromolecular compound is used as a raw material. The effect of static charge on the LGP is avoided by the electro-conductive property of the LGP.

16 Claims, 4 Drawing Sheets

(56) References Cited

U.S. PATENT DOCUMENTS

| | | |
|---|---|---|
| 2006/0003274 A1 | 1/2006 | Imamura et al. |
| 2006/0068329 A1* | 3/2006 | Aylward ............... G02F 1/1333 430/311 |
| 2008/0045636 A1* | 2/2008 | Iyama .................. C08K 5/0025 524/154 |
| 2009/0233011 A1* | 9/2009 | Suh ...................... G02B 5/0242 428/1.33 |
| 2010/0002298 A1* | 1/2010 | Sugino ..................... B32B 7/12 359/485.01 |
| 2010/0020396 A1* | 1/2010 | Izumi ............... G02F 1/133528 359/485.01 |
| 2012/0294038 A1* | 11/2012 | Huang ................. G02B 6/0083 362/611 |

OTHER PUBLICATIONS

First Chinese Office Action dated Apr. 2, 2014; Appln. No. 201310049532.X.

Second Chinese Office Action dated Dec. 3, 2014; Appln. No. 201310049532.X.

Chinese Rejection Decision dated May 11, 2015; Appln. No. 201310049532.X.

International Preliminary Report on Patentability Appln. No. PCT/CN2013/074144; Dated Aug. 11, 2015.

* cited by examiner

ANTISTATIC LIGHT GUIDE PLATE AND METHOD FOR FABRICATING THE SAME

FIELD OF THE ART

Embodiments of the invention relate to the field of liquid crystal display technologies, more particularly, to an antistatic light guide plate (LGP) and a method for fabricating the same.

BACKGROUND

After conducting performance test on a liquid crystal display (LCD) module, a LGP of the LCD module often has some defects such as white dots and/or scratch caused by foreign objects. The foreign objects are usually adsorbed onto the LGP by electrostatic charges. The above defects can be prevented if the electrostatic charges on the LGP can be effectively released.

SUMMARY

The disclosure provides an antistatic LGP and a method for fabricating the same.

A first aspect of the invention provides a LGP, the LGP is electro-conductive.

For example, an electro-conductive film made of an electro-conductive organic macromolecular compound is disposed on one or more surfaces of the LGP.

For example, the electro-conductive organic macromolecular compound is polyaniline or polythiophene.

For example, a material of the LGP is an electro-conductive organic macromolecular compound, or a material of the LGP comprises an electro-conductive organic macromolecular compound.

For example, the electro-conductive organic macromolecular compound is polyaniline or polythiophene.

For example, a fluorescent powder layer is coated on one or more surfaces of the LGP.

For example, it further comprises a side adhesive tape disposed on at least one side surface of the LGP.

For example, the side adhesive tape comprises an electro-conductive layer and a reflective layer, and the reflective layer is attached to the at least one side surface of the LGP.

A second aspect of the disclosure provides a method for fabricating an antistatic LGP, the method comprises the steps of:
preparing an electro-conductive solution;
making one or more surfaces of a regular LGP adsorb the electro-conductive solution uniformly; and
drying the LGP that adsorbed the electro-conductive solution to form an electro-conductive film on the one or more surfaces of the LGP.

For example, the step of preparing the electro-conductive solution comprises: dissolving an electro-conductive organic macromolecular compound and ink in an acidic solution, or by dissolving an electro-conductive organic macromolecular compound in an acidic solution; the step of making one or more surfaces of a regular LGP adsorb the electro-conductive solution uniformly comprises: cleansing and then soaking the regular LGP in the electro-conductive solution.

For example, the step of preparing the electro-conductive solution comprises: dissolving an electro-conductive organic macromolecular compound and ink in an acidic solution; the step of making one or more surfaces of a regular LGP adsorb the electro-conductive solution uniformly comprises: spraying the electro-conductive solution onto one or more surfaces of the regular LGP after cleansing the regular LGP.

For example, the method further comprises the following step: attaching a side adhesive tape to at least one side surface of the LGP.

A third aspect of the disclosure provides a method for fabricating a LGP, the method comprises steps of:
providing an electro-conductive organic macromolecular compound or a mixture of an electro-conductive organic macromolecular compound and polymethylmethacrylate as a raw material and plasticizing the raw material;
filling the plasticized material into a mold;
pressure-holding the mold filled with the material; and
cooling the pressure-held mold.

For example, the method further comprises the following step: attaching a side adhesive tape to at least one side surface of the LGP.

BRIEF DESCRIPTION OF THE DRAWINGS

In order to clearly illustrate the technical solution of the embodiments of the invention, the drawings of the embodiments will be briefly described in the following. It is obvious that the described drawings are only related to some embodiments of the invention and thus are not limitative of the invention.

1-antistatic LGP; 2-side surface; 3-adhesive tape; 4-condutive layer; 5-reflective layer.

DETAILED DESCRIPTION

In order to make objects, technical details and advantages of the embodiments of the invention apparent, the technical solutions of the embodiment will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

Embodiment 1

Figure 1:
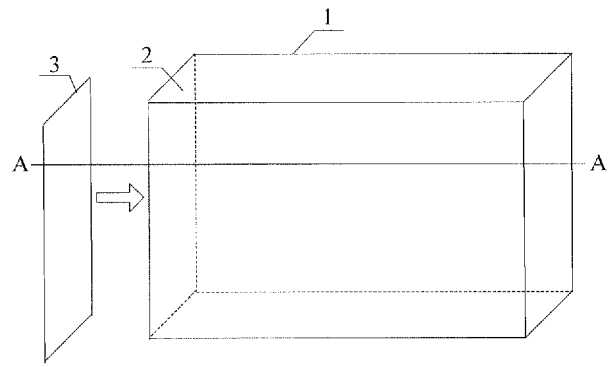
FIG. 1 schematically illustrates a diagram of attaching a side adhesive tape to a side surface of an antistatic LGP provided in at least one of Embodiments 1 to 3 of the invention.
Figure 2:
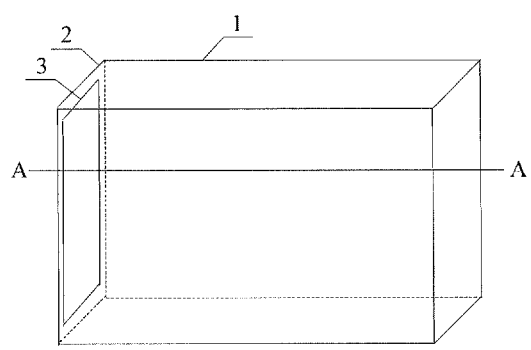
FIG. 2 schematically illustrates diagram after attaching a side adhesive tape to a side surface of an antistatic LGP provided in at least one of Embodiments 1 to 3 of the invention.
Figure 3:
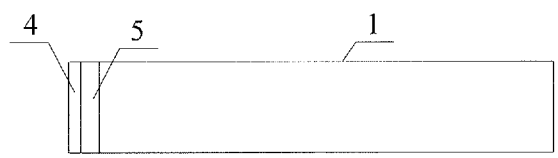
FIG. 3 schematically illustrates a cross section of the antistatic LGP provided in at least one of Embodiments 1 to 3 taking along line A-A of FIGS. 1 and 2.

An antistatic LGP provided by the embodiment of the invention is electro-conductive. An electro-conductive film made of an electro-conductive organic macromolecular compound is disposed on one or more surfaces of the antistatic LGP provided by the embodiment. In the embodiment, the electro-conductive organic macromolecular compound is polyaniline or polythiophene. For example, to make the antistatic LGP release the electrostatic charges in a better way, an electro-conductive adhesive tape 3 is disposed on a side surface 2 of the antistatic LGP 1, as illustrated in FIGS. 1 and 2. The side adhesive tape 3 comprises an electro-conductive layer 4 and a reflective layer 5, and the reflective layer 5 is attached to the side surface 2 of the antistatic LGP 1 as illustrated in FIG. 3. Herein, the electro-conductive layer 4 is used to release the electrostatic charges generated on surfaces of the LGP; the reflective layer 5 is mainly used to reflect light exiting the side surface of the LGP back to the interior of the LGP. Generally, most of the electrostatic charges generated on the LGP are distributed on its edges, thus, the electrostatic charges on the surfaces of the LGP are released into the environment via the electro-conductive tape. Therefore, the side adhesive tape comprising the dual layer structure acts as a conductor. Furthermore, in other embodiments of the invention, the side adhesive tape 3 may also be disposed on the remaining side surfaces of the LGP 1 of FIG. 1, except for the side surface having a backlight; for example, the side adhesive tape 3 is disposed on at least one side surface, which can achieve the above effect in the same way.

Figure 4:
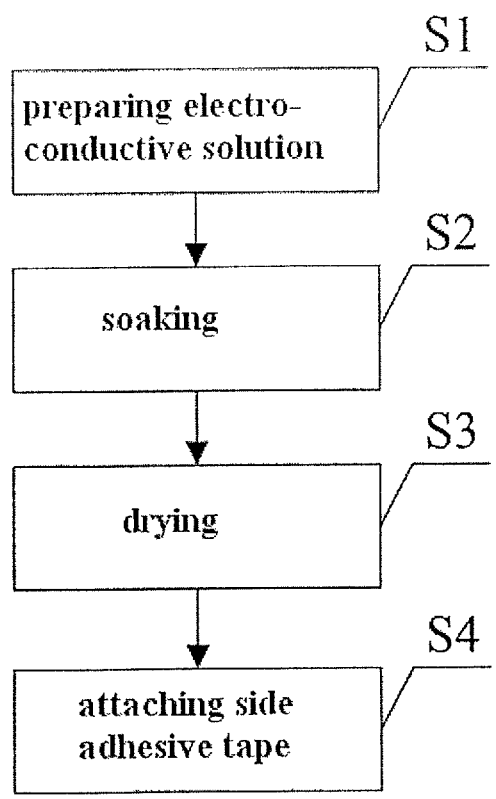
FIG. 4 is a flow chart of fabricating an antistatic LGP provided by Embodiment 1 of the invention.

As illustrated in FIG. 4, a method for fabricating the antistatic LGP provided by the embodiment comprises the following steps:

S1: preparing an electro-conductive solution; the electro-conductive solution is obtained by dissolving an electro-conductive organic macromolecular compound and ink in an acidic solution, or by dissolving an electro-conductive organic macromolecular compound in an acidic solution;

S2: cleansing and then soaking a regular LGP in the electro-conductive solution and making one or more surfaces of the regular LGP adsorb the electro-conductive solution uniformly;

S3: drying the LGP adsorbing the electro-conductive solution to form an electro-conductive film on the one or more surfaces of the LGP, thereby obtaining an antistatic LGP.

For example, as illustrated in FIGS. 1 and 2, the method further comprises the following step:

S4: attaching an electro-conductive adhesive tape 3 to a side surface 2 of the antistatic LGP 1.

In the embodiment, the electro-conductive organic macromolecular compound in step S1 is polyaniline or polythiophene.

When being used, by contacting a locating post (not shown) of the antistatic LGP with an electro-conductive back cover (not shown), the electrostatic charges on the antistatic LGP can be released, preventing the electrostatic charges from adsorbing foreign objects.

Embodiment 2

An antistatic LGP provided by the embodiment is electro-conductive. An electro-conductive film made of an electro-conductive organic macromolecular compound is disposed on one or more surfaces of the antistatic LGP provided by the embodiment. In the embodiment, the electro-conductive organic macromolecular compound is polyaniline or polythiophene. For example, to make the antistatic LGP release the electrostatic charges in a better way, an electro-conductive adhesive tape 3 is disposed on a side surface 2 of the antistatic LGP 1, as illustrated in FIGS. 1 and 2. The side adhesive tape 3 comprises an electro-conductive layer 4 and a reflective layer 5, and the reflective layer 5 is directly attached to the side surface 2 of the antistatic LGP 1 as illustrated in FIG. 3.

Figure 5:
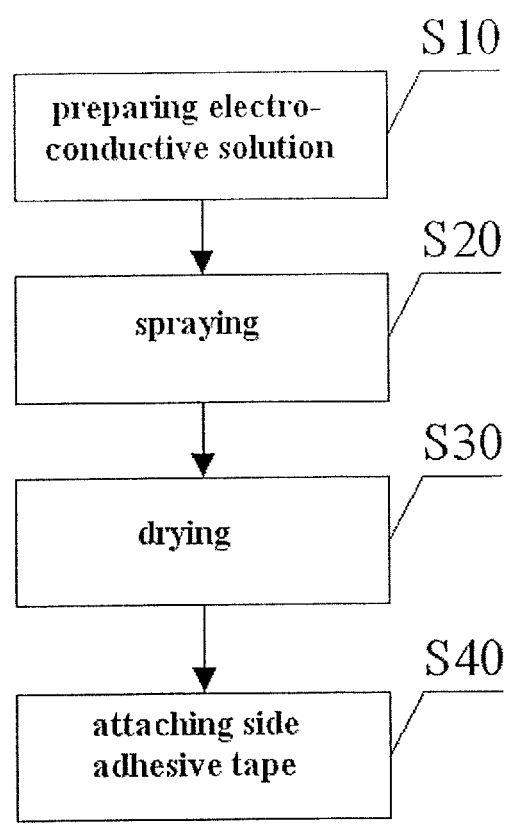
FIG. 5 is a flow chart of fabricating an antistatic LGP provided by Embodiment 2 of the invention.

As illustrated in FIG. 5, a method for fabricating the antistatic LGP provided by the embodiment comprises the following steps:

S10: preparing an electro-conductive solution; the electro-conductive solution is obtained by dissolving an electro-conductive organic macromolecular compound and ink in an acidic solution; wherein the ink is added to make the electro-conductive organic macromolecular compound in the electro-conductive solution adsorb onto the surfaces of the LGP more easily;

S20: spraying the electro-conductive solution onto one or more surfaces of a cleansed regular LGP and making the surface of the regular LGP adsorb the electro-conductive solution uniformly;

S30: drying the LGP adsorbing the electro-conductive solution to form an electro-conductive film on the one or more surfaces of the LGP, thereby obtaining an antistatic LGP.

For example, as illustrated in FIGS. 1 and 2, the method further comprises the following step:

S40: attaching an electro-conductive adhesive tape 3 to a side surface 2 of the antistatic LGP 1.

In the embodiment, the electro-conductive organic macromolecular compound in step S10 is polyaniline or polythiophene.

When being used, by contacting a locating post (not shown) of the antistatic LGP with an electro-conductive back cover (not shown), the electrostatic charges on the antistatic LGP can be released, preventing the electrostatic charges from adsorbing foreign objects.

Embodiment 3

An antistatic LGP provided by the embodiment is electro-conductive. A material of the antistatic LGP provided by the embodiment is an electro-conductive organic macromolecular compound, or its material comprises an electro-conductive organic macromolecular compound, making the antistatic LGP electro-conductive. In the embodiment, the electro-conductive organic macromolecular compound is at least one of polyaniline and polythiophene.

The color of polyaniline in solid state is green, and the color of polythiophene in solid state is red. The light-transmittance of both polyaniline and polythiophene is close to that of polymethylmethacrylate (PMMA). If polyaniline, or a mixture of polyaniline and PMMA is used as the raw material, the fabricated antistatic LGP appears as green. If polythiophene, or a mixture of polythiophene and PMMA is used as the raw material, the fabricated antistatic LGP appears as red. If a mixture of polyaniline, polythiophene and PMMA is used as the raw material, the fabricated antistatic LGP has a hybrid color of red and green. When white light passes through a green antistatic LGP, the green antistatic LGP turns the light from white to green. When white light passes through a red antistatic LGP, the red antistatic LGP turns the light from white to red. When white light passes through a hybrid green-red antistatic LGP, the hybrid green-red antistatic LGP turns the light from white to hybrid green-red. To prevent white light passing through the antistatic LGP from changing its color, a fluorescent powder layer is coated on one or more surfaces of the antistatic LGP. The fluorescent powder layer transform the green, red or hybrid green-red light back to white again.

For example, to make the antistatic LGP release the electrostatic charges in a better way, an electro-conductive adhesive tape 3 is disposed on a side surface 2 of the antistatic LGP 1, as illustrated in FIGS. 1 and 2. The side adhesive tape 3 comprises an electro-conductive layer 4 and a reflective layer 5, and the reflective layer 5 is directly attached to the side surface 2 of the antistatic LGP 1 as illustrated in FIG. 3.

Figure 6:
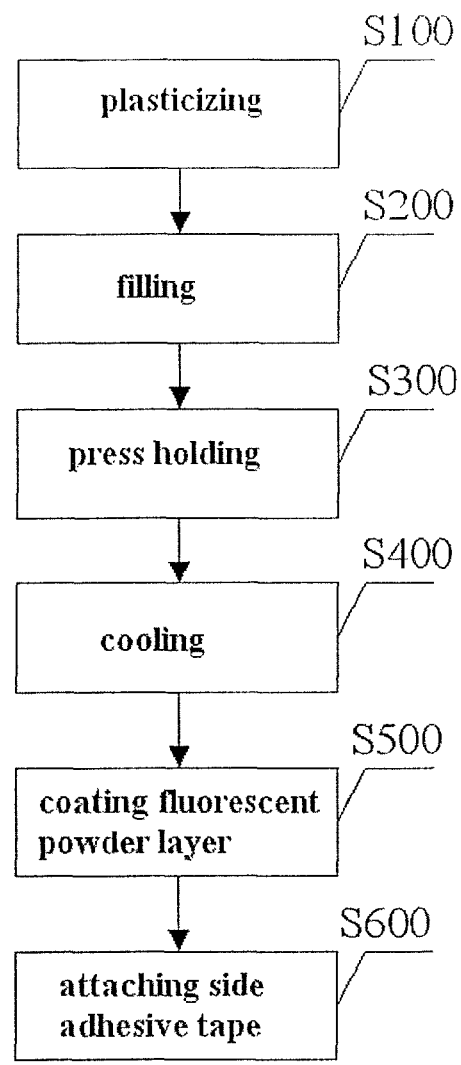
FIG. 6 is a flow chart of fabricating an antistatic LGP provided by Embodiment 3 of the invention.

As illustrated in FIG. 6, a method for fabricating the antistatic LGP provided by the embodiment comprises the following steps:

S100: providing an electro-conductive organic macromolecular compound or a mixture of an electro-conductive organic macromolecular compound and PMMA as a raw material and plasticizing the raw material;

S200: filling the plasticized material into a mold;

S300: pressure-holding the mold filled with the material; and

S400: cooling the pressure-held mold to obtain an antistatic LGP.

In the embodiment, the electro-conductive organic macromolecular compound in step S100 is polyaniline or polythiophene.

For example, the method further comprises the following step:

S500: coating a fluorescent powder layer on the one or more surfaces of the LOP.

For example, as illustrated in FIGS. 1 and 2, the method further comprises the following step:

S600: attaching an electro-conductive adhesive tape 3 to a side surface 2 of the antistatic LGP 1.

When being used, by contacting a locating post (not shown) of the antistatic LGP with an electro-conductive back cover (not shown), the electrostatic charges on the antistatic LGP can be released, preventing the electrostatic charges from adsorbing foreign objects.

In summary, an electro-conductive film is disposed on one or more surfaces of the antistatic LGP in at least one embodiment of the invention; alternatively, the antistatic LGP is made of an electro-conductive organic macromolecular compound, or made of the material comprising an electro-conductive organic macromolecular compound, making the antistatic LGP electro-conductive, therefore the electrostatic charges can be effectively released. By attaching an electro-conductive adhesive tape on a side surface of the antistatic LGP, the antistatic LGP can release the electrostatic charges in a better way.

What are described above is related to the illustrative embodiments of the disclosure only and not limitative to the scope of the disclosure; the scopes of the disclosure are defined by the accompanying claims.

What is claimed is:

1. A light guide plate (LGP), comprising an electro-conductive and a side adhesive tape disposed on at least one side surface of the LGP, wherein the side adhesive tape comprises:
    a reflective layer with a first surface of the reflective layer being attached to the at least one side surface of the LGP; and
    an electro-conductive layer to release electrostatic charges generated on surfaces of the LGP, the electro-conductive layer being attached to a second surface of the reflective layer that is opposite to the first surface of the reflective layer.

2. The LGP of claim 1, wherein an electro-conductive film made of an electro-conductive organic macromolecular compound is disposed on one or more surfaces of the LGP.

3. The LGP of claim 2, wherein the electro-conductive organic macromolecular compound is polyaniline or polythiophene.

4. The LGP of claim 1, wherein a material of the LGP is an electro-conductive organic macromolecular compound, or a material of the LGP comprises an electro-conductive organic macromolecular compound.

5. The LGP of claim 4, wherein the electro-conductive organic macromolecular compound is at least one of polyaniline and polythiophene.

6. The LGP of claim 4, wherein a fluorescent powder layer is coated on one or more surfaces of the LGP.

7. A method for fabricating a LGP, comprising steps of:
    preparing an electro-conductive solution;
    making one or more surfaces of a regular LGP adsorb the electro-conductive solution uniformly; and
    drying the LGP that adsorbed the electro-conductive solution, to form an electro-conductive film on the one or more surfaces thereof, wherein:
    the step of preparing the electro-conductive solution comprises: dissolving an electro-conductive organic macromolecular compound and ink in an acidic solution, or dissolving an electro-conductive organic macromolecular compound in an acidic solution;
    the step of making one or more surfaces of a regular LGP adsorb the electro-conductive solution uniformly comprises: cleansing and then soaking the LGP in the electro-conductive solution.

8. The method of claim 7, wherein,
    the step of making one or more surfaces of a regular LGP adsorb the electro-conductive solution uniformly comprises: spraying the electro-conductive solution onto one or more surfaces of a cleansed regular LGP.

9. The method of claim 7, wherein the electro-conductive organic macromolecular compound is polyaniline or polythiophene.

10. The method of claim 7, further comprising a step of: attaching a side adhesive tape to at least one side surface of the LGP.

11. The method of claim 10, wherein the side adhesive tape comprises an electro-conductive layer and a reflective layer, and the reflective layer is attached to the at least one side surface of the LGP.

12. A method for fabricating a LGP, comprising steps of:
    providing an electro-conductive organic macromolecular compound or a mixture of an electro-conductive organic macromolecular compound and polymethylmethacrylate as a raw material and plasticizing the raw material;
    filling the plasticized material into a mold;
    pressure-holding the mold filled with the material; and
    cooling the pressure-held mold.

13. The method of claim 12, wherein the electro-conductive organic macromolecular compound is at least one of polyaniline and polythiophene.

14. The method of claim 12, further comprising a step of: coating a fluorescent powder layer on one or more surfaces of the LGP.

15. The method of claim 12, further comprising a step of: attaching a side adhesive tape to at least one side surface of the LGP.

16. The method of claim 15, wherein the side adhesive tape comprises an electro-conductive layer and a reflective layer, and the reflective layer is attached to the at least one side surface of the LGP.

* * * * *